UNITED STATES PATENT OFFICE.

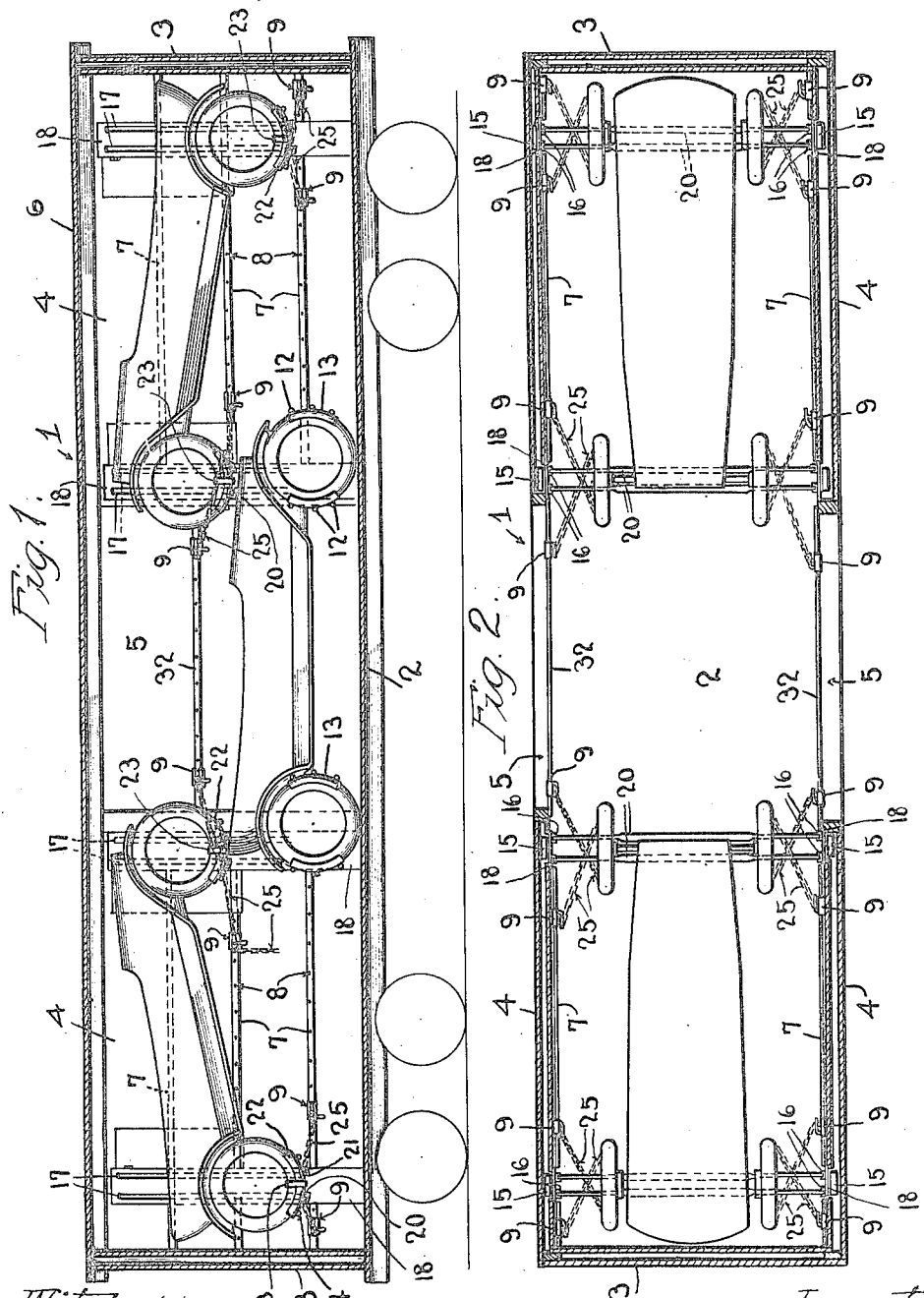

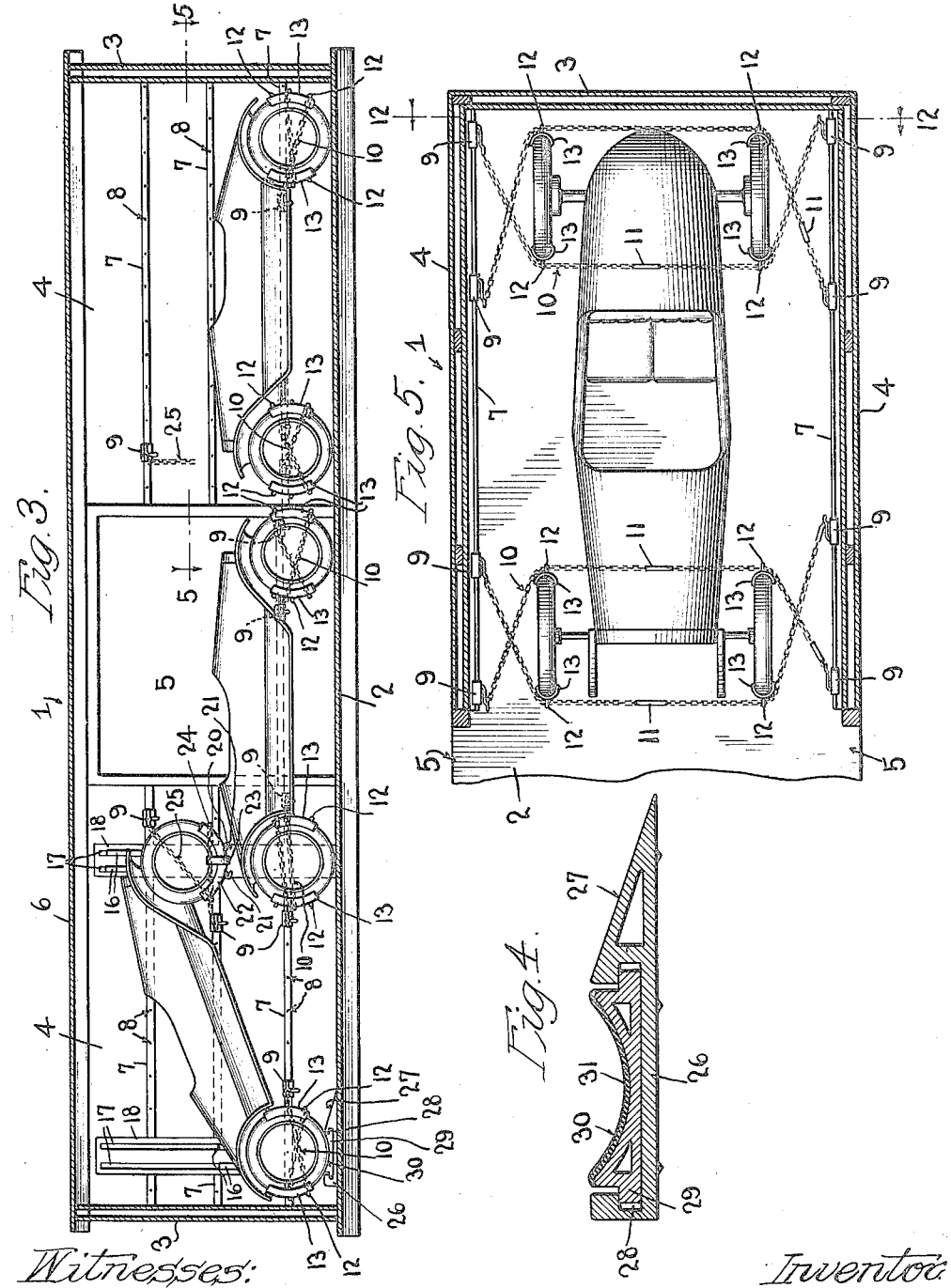

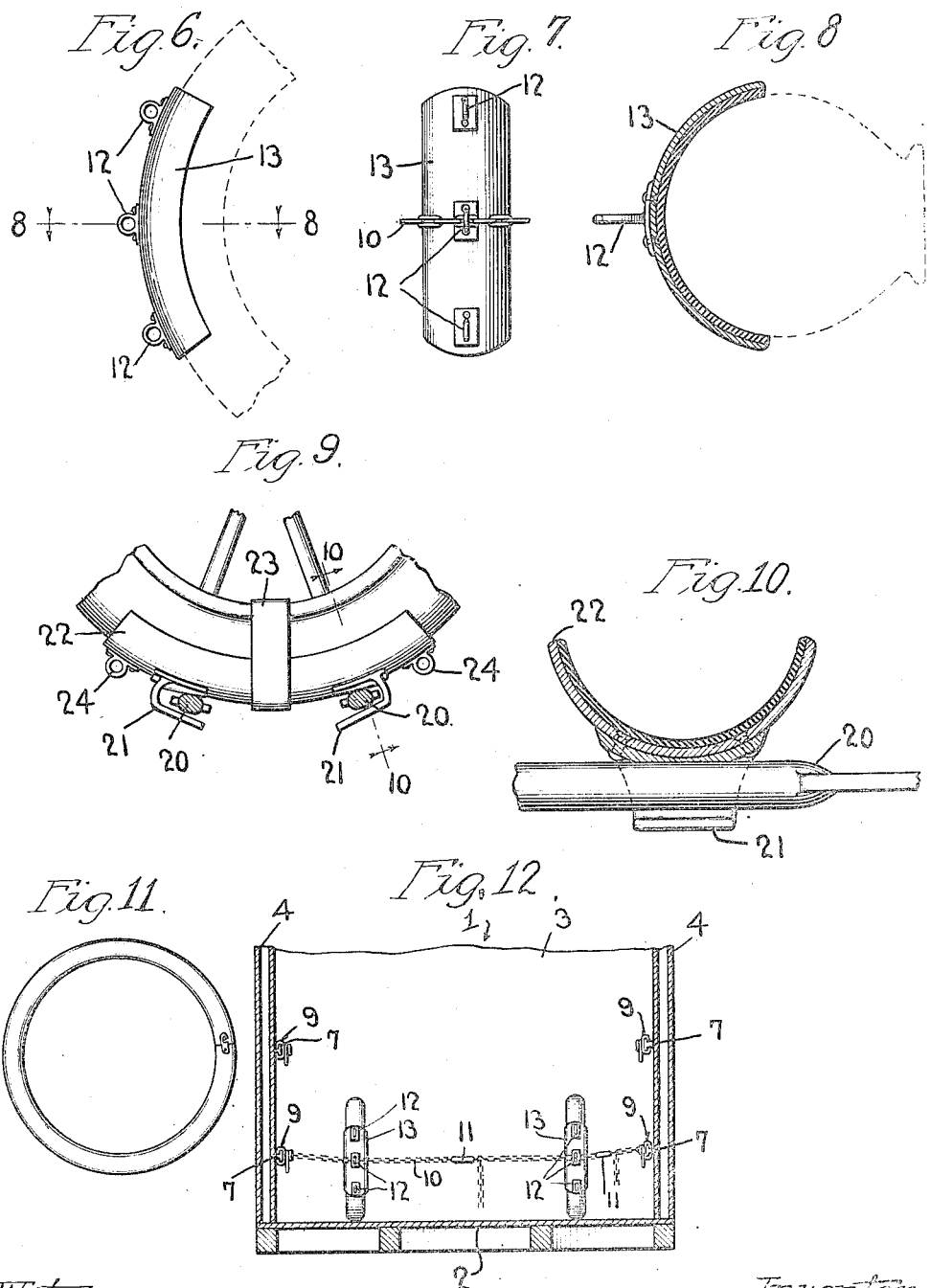

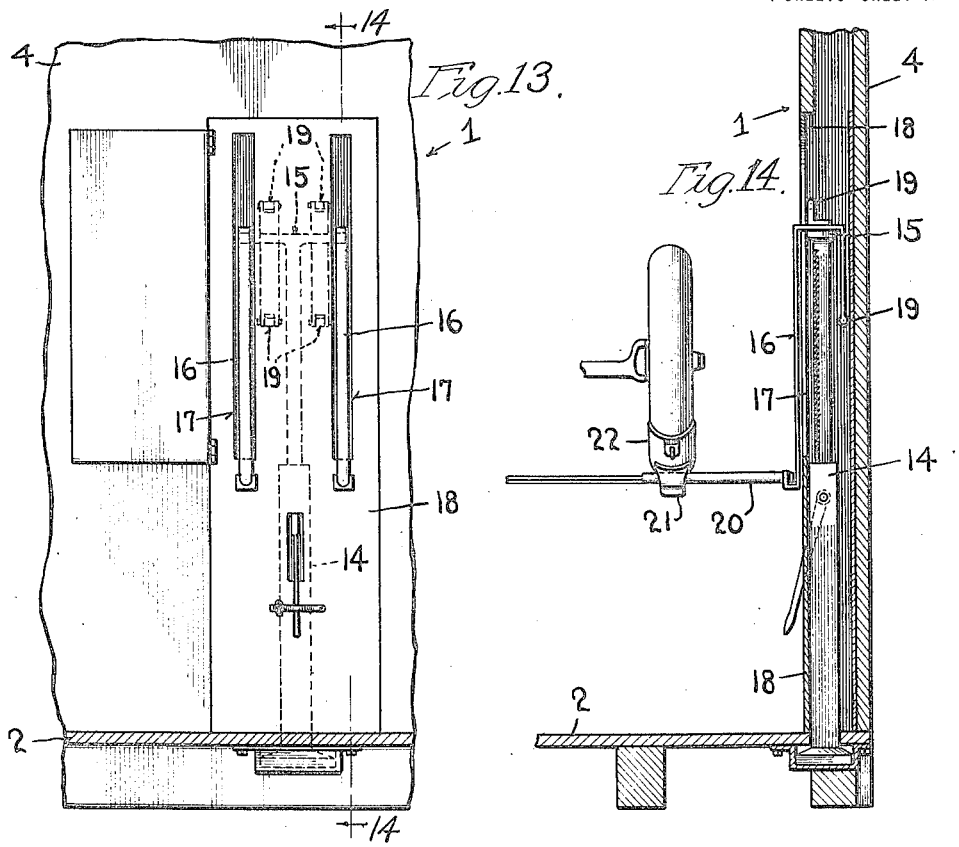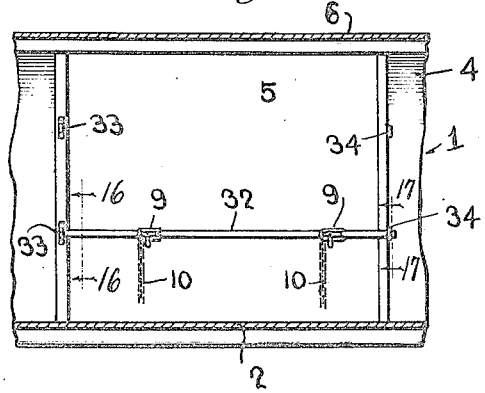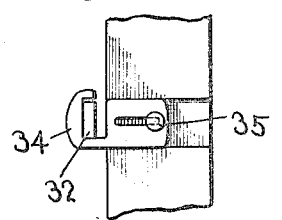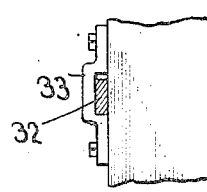

JOHN M. DALY, OF CHICAGO, ILLINOIS.

METHOD AND APPARATUS FOR TRANSPORTING VEHICLES.

1,282,764.   Specification of Letters Patent.   Patented Oct. 29, 1918.

Application filed February 9, 1916.   Serial No. 77,308.

*To all whom it may concern:*

Be it known that I, JOHN M. DALY, a citizen of the United States, a resident of Chicago, in the county of Cook and State of Illinois, have invented new and useful Improvements in Methods and Apparatus for Transporting Vehicles, of which the following is a specification.

This invention relates to a method and apparatus for transporting vehicles, and has for one of its objects to make provision for the economical loading and transportation of vehicles, particularly motor vehicles, in freight cars.

The invention has for a further object to improve upon the present system of loading and transporting vehicles, and contemplates the provision of a car within which a plurality of vehicles may be immovably fixed, by a plurality of shoes engaging the vehicle wheels, and bracing means between the shoes and the sides of the car, also in the provision of supporting means for said shoes which will permit the stacking of vehicles over each other.

The apparatus through and by means of which this method of loading and transporting vehicles may be made effective, includes a car of the ordinary type, or one especially built for the purpose, a plurality of longitudinally adjustable members having connections with a plurality of shoes which are adapted to engage the wheels of the vehicles, so as to hold the vehicles in fixed positions within the car, and also means for elevating and supporting a vehicle, or vehicles, or parts thereof, and holding the same in fixed position within the car.

In the drawings,

Figure 1 represents a longitudinal vertical section through a railway car constructed so as to embody my invention, and having a load braced and supported therein:

Fig. 2 is a horizontal longitudinal cross-section thereof, showing the position of the loaded vehicles in plan;

Fig. 3 is a vertical longitudinal section of a car connected so as to embody my invention, slight changes in arrangement being made from the construction shown in Fig. 1;

Fig. 4 is a vertical cross section of the detail of the supporting block for the wheels of the motor vehicle;

Fig. 5 is a horizontal section taken substantially on line 5—5 of Fig. 3;

Figs. 6, 7 and 8 are side and end elevations and transverse cross section, respectively, of one of the bracing shoes;

Fig. 9 is a side elevation of a portion of a vehicle wheel showing the bottom supporting shoe thereon;

Fig. 10 is a section taken on line 10—10 of Fig. 9;

Fig. 11 is a perspective view of a protector for the tire;

Fig. 12 is a cross-section taken on line 12—12 of Fig. 5;

Fig. 13 is a side elevation of the part of the interior of a car showing the arrangement of mechanism for raising and supporting a motor vehicle within the car.

Fig. 14 is a sectional view taken on line 14—14 of Fig. 13, illustrating the manner of supporting the motor vehicle in a car;

Fig. 15 is a detail view of the inside of the car showing the door-way and a removable bar on which the lock box is slidable.

Figs. 16 and 17 are sectional views, respectively, on line 16—16 and 17—17 of Fig. 15, showing the connections for supporting each end of this removable door.

With the present method of loading and transporting vehicles, considerable damage is done, due to the inefficient methods of securing the vehicles within the car, and the work necessary to load and unload the vehicles. The damage is due to a number of causes, some arising from the severe handling to which cars are frequently subjected, others being due to the inefficient and unskilled workmen employed in loading and unloading, and to the inefficient and insecure means provided for bracing the vehicles, resulting in breakage, and particularly in scratching the high finish of the vehicles.

By the use of the method and apparatus herein disclosed, vehicles may be expeditiously loaded and braced in position within a car, the bracing means forming a permanent part of the car and obviating the necessity of driving nails, screws or other securing means in the car body, and the consequent withdrawing of securing means, with the liability of damage to the vehicles, and to the car itself.

The apparatus I employ will permit the loading of vehicles of different sizes in the same car, and also allow the vehicles to be stacked one over the other, whereby the loading capacity of the car is greatly increased and the cost of shipping of vehicles materially reduced, this being due to the form of tariff rate on vehicle cars.

Referring now to the drawings, I show a car for transportation on railroads designated by the numeral 1, which may be built to embody the construction herein specified, or which may be of standard construction and have the devices herein described, installed therein. This car includes the bottom 2, end walls 3, sides 4 having the doorways 5 and the roof 6, as is customary in freight cars at present in general use.

Extending longitudinally along the inside faces of the side walls of the car, I provide the tracks or bars 7, a plurality of these members being provided as indicated, and each having a plurality of apertures 8 therein and also having a lock box or member 9 of suitable construction movable thereon, this lock box including means adapted to enter said apertures whereby it may be held against longitudinal movement. The particular construction of this lock box is described and claimed in patent numbered 1,247,230, issued November 20th, 1917, and does not form any particular part of this application. As stated above, this lock box includes means for locking it in different positions relative to the bars or tracks 7 and has an eye to receive a chain or flexible connection 10. This chain or flexible connection 10 is adapted to extend transversely across the car from one lock box 9 to a corresponding lock box having a turn buckle 11 for proper adjustment thereof. The chain or flexible connection is adapted to be passed through one of the eyes 12 on the curved shoe 13 which is adapted to fit the tire of the motor vehicle. The particular arrangement of these shoes and flexible connection 10, is illustrated best in Figs. 2 and 5, where it is seen that one of the chains or flexible connections extends from the rear pair of locking boxes to the shoes 13 which are secured against the front of the tires of the rear wheels of the vehicle and that the chain or flexible connection between the forward pair of locking boxes passes through the links on the shoes which engage the rear portions of the tires on the rear wheels of the motor vehicle, so that when the turn buckles are tightened, the rear wheels are securely locked and braced against movement in either direction. This same arrangement is utilized in connection with the front wheels of the motor vehicle so that it is positively braced against movement in both directions.

This construction and arrangement is sufficient to brace and support a plurality of motor vehicles within a car, of standard size, the number of course, depending upon the length of the motor vehicles, but it is preferable to provide means for supporting a vehicle, either partially or entirely above the floor of the car, so that if the freight car is not of sufficient length to accommodate the desired number of motor vehicles, one may be suspended above the others or have part thereof suspended above one of the others, so that the desired number of motor vehicles may be loaded. As a means for accomplishing this result, I utilize the pairs of jacks 14 which are located between the opposite side walls of the car. These jacks may be of any construction, being illustrated as of the ratchet type and having means connected thereto, for supporting the motor vehicle within the car.

This means includes the elongated head of the jack 15 having the depending supporting arms 16 connected thereto. These supporting arms extend through slots 17 in the face plate 18 which covers the jack mechanism between the side walls of the car. Anti-friction means 19 are provided to facilitate the ready movement of the jack. On these depending supporting arms 16 are secured the transversely extending bars 20 which extend across to the corresponding supporting arm or bar 16 of the oppositely positioned jack. As there are two of these supporting arms 16 and supporting bars 20, a spaced pair of supports are provided which extend transversely across the car so as to support part of a motor vehicle. These supporting bars 20 are adapted to pass through the clips 21 on the bottom supporting shoes 22 which are held to the bottom of the wheel of the motor vehicle by means of a strap or band 23. These shoes are also provided with the eyes 24 to which are adapted to be attached the chain or flexible connections 25 which extend from the lock boxes 9.

If, as shown in Fig. 1, the car in which the motor vehicles are loaded is not of sufficient length to receive three motor vehicles on the floor, one will be mounted on the floor and braced as previously described, and the other two will be supported in a suspended position, as shown, and due to the engagement of the flexible connections from the locking boxes with the eyes of the bottom supporting shoes, the suspended cars will be held against movement in any direction.

It will also happen that the car will be of sufficient length to load two motor vehicles on the floor and a third motor vehicle will be held in an inclined position with one portion thereof suspended, such an arrangement being shown in Fig. 3. In loading in this manner, I provide means for supporting the lower wheels of the motor vehicle so as to prevent chafing and wear, due to any oscillation or movement of the car, this taking the form of the member 26 having the inclined face 27 provided with the guideway 28 in which is movably mounted, the sliding member 29 having a concave face 30 provided with the lining 31 on which the tire rests. As the lower wheels are braced by means of the flexible connections and locking boxes, any movement of the car will be transmitted to the sliding member 29 so as to prevent wear and chafing of the tires.

It is necessary in some instances to provide track bars or plates across the doorway as indicated in Figs. 1 and 2. This may be readily accomplished as shown in Figs. 15, 16 and 17, wherein the supplemental bar or track is designated by the reference character 32, one end being mounted in the loop or strap 33 and the other end in the latch 34, which is slidable, due to the bolt and slot connections 35 behind the frame of the door-way.

It is to be noted as shown particularly in Fig. 5 of the drawings, that the bracing members extend transversely across the car from one side to the other and as they are connected to the sides and are tightened by turn buckles, serve to brace the sides of the car and assist in preventing bulging thereof. This is also true of the supporting members 20 which extend across the sides of the car in pairs, as described.

It is therefore obvious that I have provided a new method and arrangement of loading motor vehicles in cars for transportation, whereby a maximum number of motor vehicles may be carried in each car, without the loss of considerable space and thereby materially reducing the freight bills of the shipper or the consignee.

In providing this arrangement for increasing the effective capacity of the railroad cars, I also provide simple and effective means for securely holding and bracing the cars in position within the cars, whereby they are prevented from movement in any direction, and whereby they may be quickly loaded and unloaded, with the possibility of damage reduced to a minimum. The arrangement also includes the means for supporting a motor vehicle as a whole, or in an inclined position, whereby a maximum load may be obtained, the bracing and supporting means also preventing movement and holding the automobile securely in position.

The construction is simple and strong, the parts being made of metal. Its operation is simple and requires the expenditure of a small amount of time. Provision is made for various adjustments necessary so that different sized motor vehicles may be accommodated in the different size freight cars.

What I claim is:—

1. An apparatus for storing vehicles in a railroad car, including in combination means secured to the sides of the car and extending therefrom adapted to engage the wheels of the vehicle, said means being adjustable so as to be capable of bracing the vehicles of different lengths.

2. An apparatus for storing vehicles in a railroad car, including in combination a plurality of bracing members secured to and extending from the sides of the car, means for adjusting said bracing members so that they are capable of bracing vehicles of different lengths, said bracing members including means adapted to engage the wheels of a vehicle.

3. An apparatus for storing vehicles in a railroad car, including in combination, a plurality of members adapted to engage the wheels of a vehicle, and bracing members connecting said engaging members to the sides of the car, and means for adjusting said bracing members so as to accommodate vehicles of different lengths.

4. An apparatus for storing vehicles in a railroad car, including in combination, a plurality of members adapted to engage the wheels of a vehicle, and bracing members connecting said engaging members to the sides of the car, and means for adjusting said bracing members so as to accommodate vehicles of different lengths, a plurality of bracing members being provided for each engaging member and extending in different directions therefrom so that one bracing member will tend to prevent movement of the wheel in one direction and the other bracing member will tend to prevent movement of the wheel in the other direction.

5. An apparatus for storing vehicles in a railroad car, including in combination, adjustable locking means, bracing means connected to said adjustable locking means and adapted to engage the wheel of the vehicle, said locking means being adjustable lengthwise of the car so as to brace cars of different lengths.

6. An apparatus for storing vehicles in a railroad car, including in combination, a plurality of bracing means secured to and extending from each side of the car, said bracing means being adapted to engage the wheels of a car and being adjustable so as to brace cars of different lengths, a plurality of bracing means being provided for each wheel of the vehicle and extending in different directions so as to brace the vehicle against movement in any direction.

7. An apparatus for storing vehicles in a railroad car, including in combination, a plurality of locking members adjustable longitudinally of the car and arranged in pairs on opposite sides thereof so as to provide a pair of locking members for each wheel of the vehicle, bracing members secured to said locking members and adapted to engage the wheels of the vehicle, the bracing members for each wheel extending in different directions so as to prevent movement in any direction.

8. An apparatus for storing vehicles in a railroad car, including in combination, a plurality of bracing members secured to and extending from the sides of the car, a pair of bracing members being provided for each wheel of a vehicle, means for adjusting said bracing members so that they are capable of bracing vehicles of different lengths, said bracing members from one side of the car being connected to the corresponding bracing members from the other side of the car so as to brace the car.

9. An apparatus for storing vehicles in a railroad car, including in combination, means for raising a vehicle within the car and supporting said vehicle in its raised position and bracing members secured to the sides of the car and engaging the wheels thereof to prevent movement of the vehicle, said bracing members being adjustable so as to brace vehicles of different lengths.

10. An apparatus for storing vehicles in a railroad car, including in combination, means for raising a vehicle within the car, means for supporting said vehicle in its raised position extending from one side of the car to the other, and means for bracing said vehicle against movement including bracing members engaging the wheels of the vehicle and adjustably secured to the sides of the car.

11. An apparatus for storing vehicles in a railroad car, including in combination, means for raising one end of the vehicle within the car, means for supporting said vehicle in its inclined position, and means for supporting the lower wheels of the vehicle to prevent wear and chafing of the same.

12. An apparatus for storing vehicles in a railroad car, including in combination, a plurality of bracing members adjustably secured to the sides of the car and adapted to engage the wheels of the vehicles to prevent movement thereof, and means for raising certain of said vehicles and supporting the same so that vehicles may be stacked one over the other within the car.

13. An apparatus for storing vehicles in a railroad car, including in combination, a plurality of bracing members adjustably secured to the sides of the car and adapted to engage the wheels of the vehicles to prevent movement thereof, and means for raising certain of said vehicles and supporting the same so that vehicles may be stacked one over the other within the car, and means for bracing said raised vehicles against movement in any direction.

14. An apparatus for storing vehicles in a railroad car, including in combination a plurality of bracing members adjustably secured to the sides of the car and adapted to engage the wheels of the vehicles to prevent movement thereof, means for raising certain of said vehicles and supporting the same within the car, said raising means including a jack member and a supporting means connected thereto.

15. An apparatus of the character described, including in combination, a car having a floor, top, ends, and spaced side walls, raising means for the vehicles mounted within the spaced side walls and including a jack and supporting means connected to said jack.

16. An apparatus of the character described including in combination, a car having a floor, top, ends, and spaced side walls, raising means for the vehicles arranged in pairs on opposite sides of the car and having supporting means extending transversely across the car from one raising means to the other.

17. An apparatus of the character described, including in combination, a car having a floor, top, ends and spaced side walls, raising means for the vehicles arranged in pairs on opposite sides of the car, and mounted within the spaced side walls, and including jack members and supporting means connecting the opposed jack members.

18. An apparatus for storing vehicles in a railroad car, including in combination with a car having a floor, sides, ends, top and door-ways, bars extending along the sides thereof, and bracing means adjustably mounted on said bars for bracing the vehicles within the car, and a bar removably mounted in said door-way.

JOHN M. DALY.